Oct. 9, 1945.   J. A. LAWLER ET AL   2,386,220
TWO-SPEED DRIVING MECHANISM
Filed Feb. 7, 1944   2 Sheets-Sheet 2
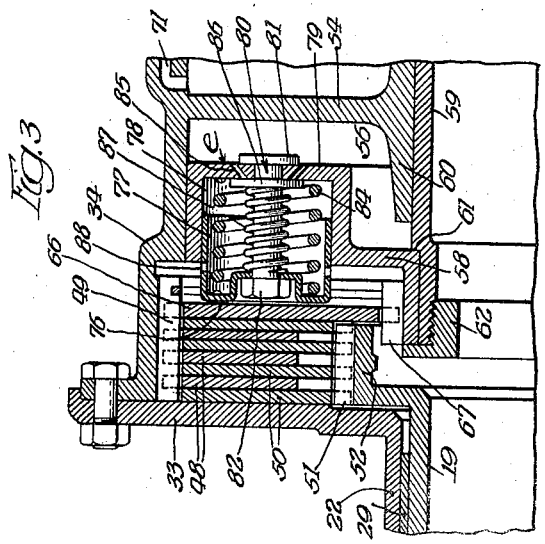
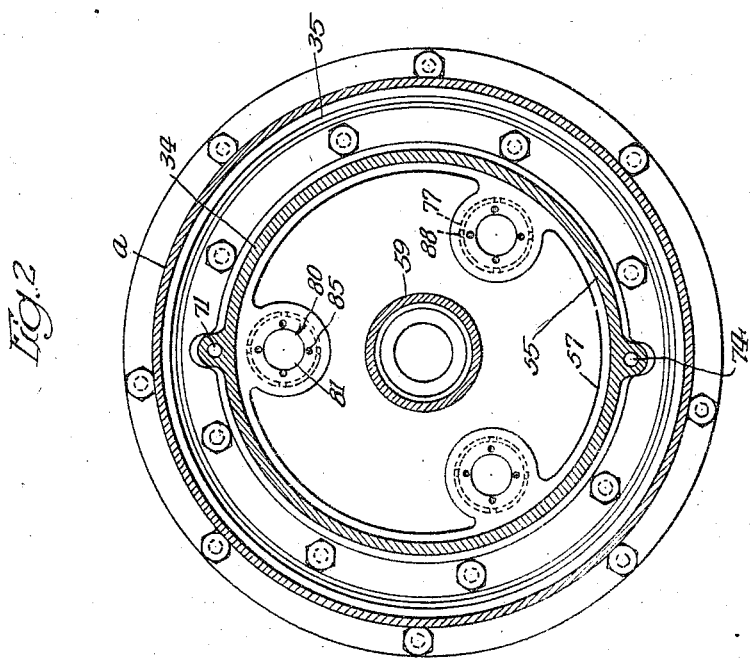
Inventors
John A. Lawler
Samuel K. Hoffman
By Fred Gerlach
their Atty.

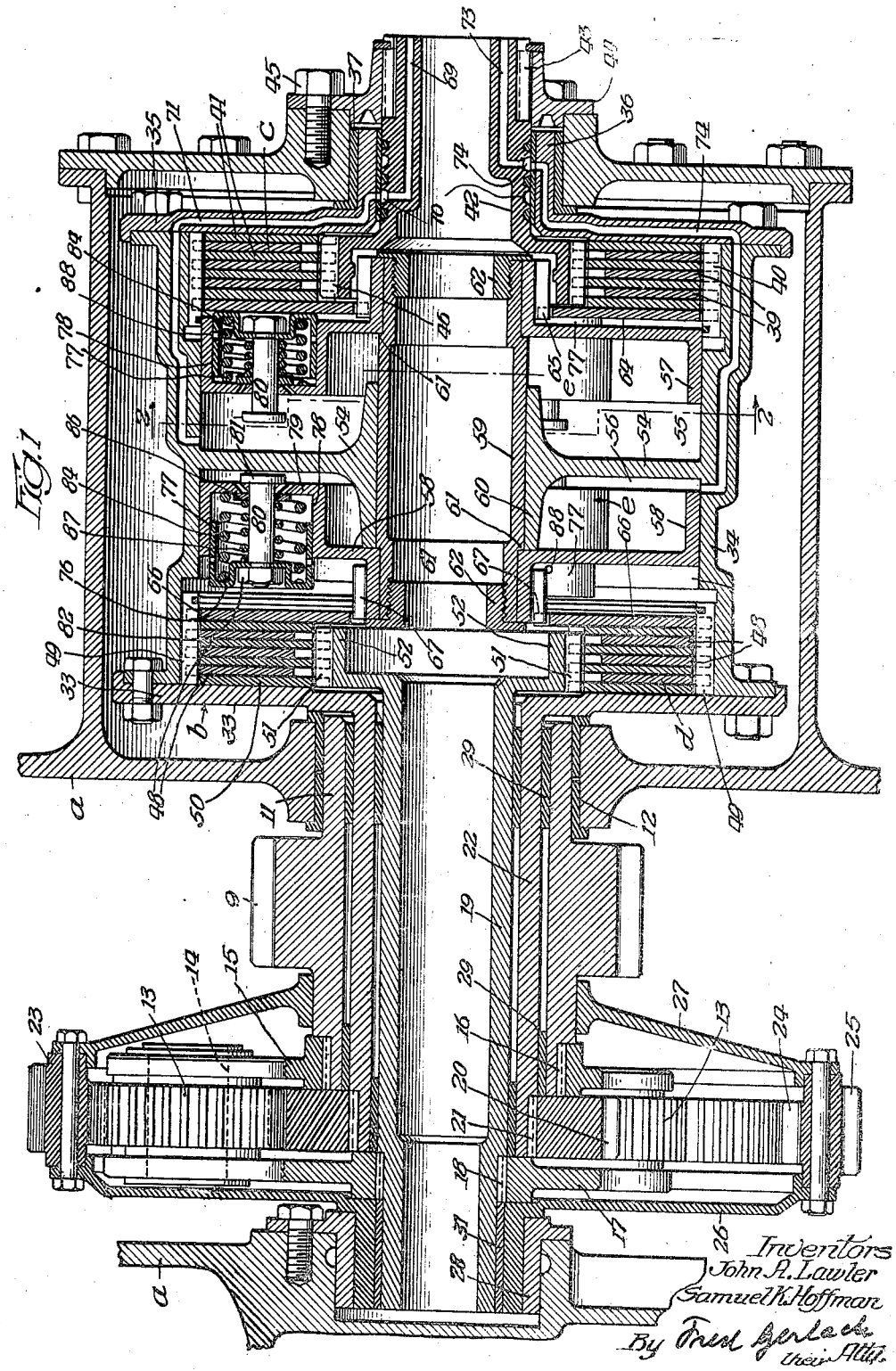

Patented Oct. 9, 1945

2,386,220

UNITED STATES PATENT OFFICE 2,386,220

TWO-SPEED DRIVING MECHANISM

John A. Lawler, Los Angeles, Calif., and Samuel K. Hoffman, Williamsport, Pa., assignors to The Aviation Corporation, New York, N. Y., a corporation of Delaware Application February 7, 1944, Serial No. 521,358

17 Claims. (Cl. 74—290)

The invention relates to two-speed driving mechanism.

One object of the invention is to provide control means for two-speed driving mechanism which is adapted to gradually effect the speed changes to avoid severe shock to gearing when speed-changes are made.

Another object of the invention is to provide a two-speed driving mechanism which is controlled by gripping devices of the friction plate type and in which provision is made for a relatively low initial engaging-pressure for permitting slippage to effect a gradual initial gripping of the plates and a subsequent greater pressure for positive engagement.

Another object of the invention is to provide improved two-speed driving mechanism of the type in which the speed changes are controlled by alternate engagement of a pair of friction plate gripping devices which are controlled by hydraulically shifted elements for pressing the devices into gripping relation.

Another object of the invention is to provide driving mechanism of this type in which the clutch-plates are pressed together with an initial low face-pressure and a subsequent higher hydraulic pressure to effect positive engagement of the plates, so that a relatively low number of plates will provide the required gripping.

Other objects of the invention will appear from the detailed description.

The invention consists in the several novel features which are hereinafter set forth and more particularly defined by claims at the conclusion hereof.

In the drawings:

Fig. 1 is a longitudinal section of a two-speed driving mechanism embodying the invention, the parts being shown in high-speed driving.

Fig. 2 is a section taken on line 2—2 of Fig. 1.

Fig. 3 is a longitudinal section illustrating one of the engaging devices of the driving mechanism in its neutral position.

The invention is exemplified in a two-speed transmission which is mounted in and enclosed by a stationary casing $a$. This transmission comprises an input gear 9 which is integral with a hollow input shaft 11 which is journaled in a bushing 12 in a wall of the casing $a$; a set of planet gears 13 which are journaled on stud shafts 14, respectively; a rotatable cage for the planet gears and their shafts which includes a side member 15 which is splined at 16 to the input shaft 11, and an opposite side member 17 which is splined as at 18 to a hollow shaft 19; a sun-gear 20 which is splined at 21 between the cage sides 15 and 17 to a hollow shaft 22 and meshes with the planet gears 13; a ring 23 which is provided with internal gear teeth 24 which mash with planet gears 13 and with external gear teeth 25 which constitute the output gear; and a ring-carrier which comprises sides 26 and 27 between which the ring is fixed. Carrier side 26 is journaled in a bushing 28 which is fixed in a wall of the casing $a$ and carrier side 27 is journaled on the input shaft 11. The sun-gear shaft 22 extends through the input shaft 11 and is provided with bushings 29 which are journaled in the input shaft. The shaft 19 extends through, and is journaled in bushings in, the sun-gear shaft 22 and is also journaled in a bushing 31 in the hub of carrier side 26. This transmission, when the sun-gear 20 and its shaft 22 are rotated with the input shaft 11 and the cage for the planet gears 13, will drive the output shaft 25 at low speed, or at the same speed as the input shaft. When the sun-gear is locked against rotation, the cage on the input shaft 11 will impart planetary movement to gears 13 and cause the gear ring 23 and output gear 25 to be driven at a higher ratio than the input shaft 11, for high speed operation.

The mechanism for varying the speed ratio of the output gear 25 relatively to the input gear 9 comprises a drum $b$ which is fixed to and rotatable with the shaft 22 and the sun-gear 20 thereon; a brake, generally designated $c$, for locking the drum $b$, the sun-gear 20 and its shaft 21 against rotation, for high speed operation of the transmission; and a disk clutch $d$ between the drum $b$ to which the sun-gear shaft is fixed, and the shaft 19 which is rotatable by the cage-side 17, for rotating the sun-gear 20 with the planet gear cage which is adapted to bodily rotate the planet gears 13 for the low speed operation of the transmission.

The drum $b$ encloses the brake $c$ and the clutch $d$ and comprises a head or flange 33 which is integral with the shaft 22, an annular or cylindrical member 34 which is bolted to head 33 and a head 35 which is bolted to member 34 and provided with a hub 36 which is journaled in a bushing 37 in one of the walls of the casing $a$.

The brake $c$ comprises a series of plates or disks 39 which are slidably splined at 40 to the annular member 34 of the drum $b$, alternate disks or plates 41 and a hollow shaft section 42 which extends through the hub 36 of drum-head 34 and is fixedly keyed at 43 to a ring or plate 44 which is secured by bolts 45 to the casing $a$ for securing shaft 40 against rotation. The intermediate disks 41 are slidably splined at 46 to the stationary shaft section 40.

The clutch d comprises a series of plates or disks 48 which are slidably splined at 49 to the annular member 34 of the drum b, and alternate disks or plates 50 which are slidably splined at 51 to a head 52 which is integral with the shaft 19 which is fixedly splined to the side 17 of the planet gear-cage. When the disks of brake c are engaged, the drum b will be secured against rotation by said disks and the stationary shaft section 42 and the drum will hold the shaft 22 and the sun-gear 20 against rotation. At this time the disks of the clutch d will be disengaged so that the cage-side 17 and shaft 19 will be free to be rotated by the stud-shafts 14 and cage-side 15 from the input shaft 11. When the disks of brake c are disengaged and the disks of clutch d are engaged, the drum b will be free to be rotated around shaft section 42 and will be driven to drive the sun-gear 20 and its shaft 22 with the input shaft 11 from the cage-side 17 through shaft 19, and the engaged disks 48, 49 which are splined respectively to the drum and to shaft 19.

The brake c and the clutch d are hydraulically controlled for alternate gripping engagement, so that when one of them is engaged the other will be free. A transverse partition wall 54 is integrally formed with the annular member 34 of the drum at its longitudinal center between the clutch d and the brake c and cylinders 55 and 56 are formed in the drum at the opposite sides of said wall, respectively. A main piston 57 is slidably fitted in the cylinder 55 and a main piston 58 is slidably fitted in the cylinder 56. Pistons 57 and 58 are secured respectively on the ends of a hollow shaft 59 which extends through and is slidable in a hub 60 which is integrally formed with the wall 54. Said main pistons are secured against annular shoulders 61 on the opposite ends of shaft 59 by flanged collars 62 which are screw-threaded into the shaft so that both of said pistons will move with said shaft and relative movement between the pistons will be prevented. Piston 57 is rotated with the drum by the inner plate 64 of the brake c. Plate 64 is slidably splined at 65 to piston 57 and to the annular member 34 of the drum. Piston 58 is rotated with the drum by the inner clutch plate 66 of the clutch d. Plate 66 is slidably splined as at 67 to the hub of said piston and to the annular member 34 of the drum. The endwise movement in opposite directions of the pistons 57, 58 is limited by the ends of the hub 60 on the wall 54.

Fluid under pressure, usually oil, and under selective control, for shifting the piston 57 and the disks of the brake c into gripping relation and locking the drum b against rotation, is delivered into the cylinder 55 through a duct 69 and an annular peripheral channel 70 in the fixed shaft-section 42, and a duct 71 which is formed in the head 35 and member 34 of the drum and communicatively connects the annular channel 70 and the inner end of cylinder 55. Fluid under pressure is delivered into the cylinder 56 for shifting the piston 58 and the disks of the clutch d into gripping relation, through a duct 73 and an annular channel 74 in fixed shaft-section 42 and a duct 74 which is formed in the head 35 and member 34 of the drum and communicatively connects channel 74 and the inner end of cylinder 56. The fluid is exhausted from the cylinders through the conduits.

A series of three combined spring and fluid pressure operable devices, generally designated e, is mounted in each of the main pistons 57 and 58 for engaging the disks of the brake c and the clutch d, respectively, when said pistons are hydraulically shifted. The engaging devices carried by each of the main pistons are alike in number, construction and operation, so that a description of one is applicable to all of them. Each engaging device comprises a cup-shaped piston member or auxiliary piston which is provided with an outer end wall 76 for frictionally engaging the inner plate of the brake c or of the clutch d and a cylindrical skirt 77 which is slidably fitted in an auxiliary cylinder 78 which is formed in a main piston and provided with an inner end wall 79. Outward movement of member e in cylinder 78 is limited by a bolt 80 which is provided with a head 81 adapted to abut against the end wall 79 of cylinder 78 and a nut 82 fitting in a recess in the end wall 76 of the auxiliary piston. A coil spring 84 between the outer end wall 76 of the auxiliary piston and the inner wall 79 of cylinder 78 is adapted to force said piston outwardly within the limit permitted by the bolt 80 when hydraulic pressure is not applied internally to said piston. Angular orifices 85 extend through the end wall 79 of auxiliary cylinder 78 for the flow of fluid into said cylinder 78 from one of the main cylinders 55 and 56 in the drum. An annular valve 86 around bolt 80 is pressed against the inner face of the end wall 79 of cylinder 78 by a spring 87 for restricting the flow of fluid from one of the main cylinders in the drum through orifices 85 into the auxiliary cylinder 78. The skirt 77 of the auxiliary piston is provided with one or more exhaust ports 88 which permit fluid to flow out of the auxiliary cylinder 78 when the auxiliary piston is in its normal extended position. Ports 88 are adapted to be closed by the slide valve action of the skirt 77 during the initial inward movement of the auxiliary piston in its cylinder 78.

When fluid under pressure is delivered to one of the main cylinders 55, 56, the main piston therein will be shifted outwardly by the hydraulic fluid. The pressure multiplied by the area of each main piston is greater than the pressure multiplied by the pressure-exposed area of the auxiliary piston carried by each main piston plus the total force exerted by the springs 84 against said auxiliary pistons, and therefore each main piston will be shifted by fluid under pressure in the main cylinder in which it is slidable until the outer main piston is arrested by the hub 60 of the wall 54. During each outstroke of the main piston produced by the admission of fluid under pressure to the main cylinder in which it is slidable, said main piston will initially move the auxiliary piston carried thereby to exert pressure against one of the inner disks through springs 84 in the auxiliary cylinder 78 so that the initial pressure against said plate will be limited correspondingly to the force of said springs. As soon as the auxiliary pistons engage their associated clutch plates, the auxiliary cylinders 78 will close the ports 88 in the skirts 77 of the auxiliary pistons, and the orifices 85 and valve 86 will restrict the inflow of fluid from one of the main cylinders into the auxiliary cylinders in the main piston sufficiently to delay the effectiveness of hydraulic pressure in the auxiliary cylinders 78 on the auxiliary pistons. Initially, the engaging surfaces of end-wall 76 will be pressed outwardly solely by springs 84 which will permit a degree of initial slippage in the brake c or the clutch d for gradually starting the gearing or gradually changing its speed. After the initial engagement of the end-walls 76 of the auxiliary pistons with the inner plate of the set of plates to be engaged, the ports 88 in the skirt 77 of the auxiliary pistons will have slid into and have been closed by the surrounding walls of the auxiliary cylinders 78. The fluid from the main cylinder will be forced through the orifices 85 past the valves 86 into the auxiliary cylinders 78 until the fluid eventually fills the latter cylinders and the pressure therein becomes substantially equal to the hydraulic pressure in the main cylinder. The force of the springs 80 and the hydraulic pressure in the auxiliary cylinders 78 of the main piston will then be cumulated against the end-wall 76 of the auxiliary pistons and thus force the associated set of plates into positive gripping relation. The rate of flow of the fluid into the auxiliary cylinders 78 is controlled by the area of orifices 85 and the amount of flow restriction by the spring-pressed valve 86. The timing in the change from spring pressure to combined spring and hydraulic pressure can be varied as desired to effect the desired gradual starting or speed changes by variation of the area of the orifices 85 and the springs 86. When fluid is exhausted from a main cylinder, the main piston therein will be shifted to its neutral position by the springs 84 in the auxiliary cylinders in said piston, as illustrated in Fig. 3. The fluid in the auxiliary cylinders 78 will then exhaust through the ports 88 in the skirts 77 of the auxiliary pistons at the outer side of the main pistons so that during the initiation of the next engaging operation no fluid under pressure will be present in the auxiliary cylinders.

When fluid is admitted to the main cylinder 55, the auxiliary pistons carried by the main piston 57 will engage the disks of the brake c, initially by spring pressure and then by combined spring and hydraulic pressure, as before described. The drum b will then be locked against rotation so that the sun-gear 20 will be locked against rotation for the high speed operation of the transmission. When fluid under pressure is admitted to the main cylinder 56, the piston 58 will be shifted to cause the plates of the clutch d to be initially engaged by spring and then by combined spring and hydraulic pressure applied to the auxiliary pistons in piston 58, as before described. The drum b will then be rotated from the cage-side 17 through shaft 19 and the clutch d to cause the sun-gear 20 and its shaft 22 to rotate with the input shaft 11 for low speed operation of the transmission.

In these operations of the transmission, the initial force for engaging a set of plates into gripping relation is derived from the springs 84 so that slippage can occur until the output gear is brought toward its full speed in a change from neutral to low or high speed, or from low to high or high to low, and as the hydraulic pressure in the auxiliary cylinders becomes effective, the plates of each set will be substantially synchronized and pressed together with the necessary force for positive driving. This construction makes it possible to provide for a given load with the minimum number of clutch plates, and the duration of the slip period is dependent upon the rate of flow under pressure into the auxiliary cylinders carried by the main piston.

The advantage of the construction described with a drum having two pressure chambers or cylinders on opposite sides of the wall 54 and main pistons which are connected to move together, as by shaft 59, are that: under variations in the centrifugal force resulting from the variations in the speed of rotation of the cylinders, the centrifugal force of oil in both cylinders will be oppositely exerted on the pistons and neutralized; the auxiliary cylinders 78 are located adjacent the outer periphery of the piston so that the oil therein, during clutch engagement of the auxiliary pistons, will also be subjected to great centrifugal force to increase the pressure of end-walls 79 against the engaged clutch or brake; and the balancing effect of the oil columns in the head 35 and in the main cylinders will exert substantially an equal and opposite pressure per unit area in the opposite direction to prevent outflow of the oil through conduits 71 and 74.

This application is a continuation in part of an application filed by us May 26, 1943, Serial No. 488,488.

The invention exemplifies two-speed clutch and brake controlled gearing which provides for gradually bringing the driving and driven elements to equal speed and for gradually securing some of them against rotation, which is of importance in the operation of engine-driven devices such as superchargers and for positive driving at both speeds, with a minimum number of clutch-plates. The invention also exemplifies improved two-speed driving mechanism in which the speed is controlled by hydraulic means arranged between a pair of coaxially arranged plate-clutches.

The invention is not to be understood as restricted to the details set forth, since these may be modified within the scope of the appended claims without departing from the spirit and scope of the invention.

Having thus described the invention, what we claim as new and desire to secure by Letters Patent is:

1. Mechanism for shifting frictional gripping elements of a transmission into gripping relation comprising, a hydraulically shiftable member, a piston movably supported in said member provided with means for forcing the elements into gripping relation, spring-means between said member and said piston for applying initial engaging-pressure to the elements, and means in and carried by said member for successively applying hydraulic engaging-pressure to the piston cumulatively with the spring means.

2. Mechanism for shifting frictional gripping elements of a transmission into gripping relation comprising a hydraulically shiftable member, a piston movably supported in said member, provided with means for forcing the elements into gripping relation, spring-means between said member and said piston for applying initial engaging-pressure to the elements, means in and carried by said member for successively applying hydraulic pressure to the piston cumulatively with the spring means, and restricted flow valve-means for controlling the flow of fluid to the piston.

3. Mechanism for shifting frictional gripping elements of a transmission into gripping relation comprising, a hydraulically shiftable member, a piston movably supported in said member provided with means for forcing the elements into gripping relation for the piston in said member, spring-means between said member and said piston for applying initial engaging-pressure to the elements, and means in and carried by said member for conducting fluid under pressure into the cylinder and successively applying hydraulic engaging-pressure to the piston cumulatively with the spring-means.

4. Mechanism for shifting frictional gripping elements of a transmission into gripping relation comprising, a hydraulically shiftable member, a piston movably supported in said member provided with a surface for forcing the elements into gripping relation, a cylinder for the piston in said member, spring-means between said member and said piston for applying initial engaging-pressure to the elements, means in and carried by said member for conducting fluid under pressure through the member to the cylinder and piston, and means for controlling the fluid to the cylinder for cumulating its pressure with the spring-means.

5. Mechanism for engaging frictional gripping elements of a transmission comprising a main cylinder, a hydraulically operable main piston in the main cylinder, an auxiliary cylinder in the main piston, an auxiliary piston slidably mounted in the auxiliary cylinder, spring-means between the main piston and the auxiliary piston for applying initial engaging-pressure to the elements, and means for controlling the flow of fluid into the auxiliary cylinder from the main cylinder for successively applying hydraulic pressure to the auxiliary piston cumulatively with the spring pressure.

6. Mechanism for engaging frictional gripping elements of a transmission comprising a main cylinder, a hydraulically operable main piston in the main cylinder, an auxiliary cylinder in the main piston, an auxiliary piston slidably mounted in the auxiliary cylinder, spring means between the main piston and the auxiliary piston for applying initial engaging-pressure to the elements, and valve means in the auxiliary cylinder for controlling the flow of fluid into the auxiliary cylinder from the main cylinder for successively applying hydraulic pressure to the auxiliary piston cumulatively with the spring pressure.

7. Mechanism for engaging frictional gripping elements of a transmission comprising a main cylinder, a hydraulically operable main piston in the main cylinder, an auxiliary cylinder in the main piston, an auxiliary piston slidably mounted in the auxiliary cylinder, spring-means between the main piston and the auxiliary piston for applying initial engaging-pressure to the elements, valve means in the auxiliary cylinder for controlling the flow of fluid into the auxiliary cylinder from the main cylinder for successively applying hydraulic pressure to the auxiliary piston cumulatively with the spring pressure, and an exhaust duct for the fluid in the auxiliary cylinder, open when the auxiliary piston is in its normal position, and closed by the movement of the auxiliary piston for returning fluid in the auxiliary cylinder for cumulating the hydraulic and spring pressures.

8. Mechanism for engaging frictional gripping elements of a transmission comprising a main cylinder, a hydraulically operable main piston in the main cylinder, an auxiliary cylinder in the main piston adjacent the periphery of the main cylinder, an auxiliary piston slidably mounted in the auxiliary cylinder, spring-means between the main piston and the auxiliary piston for applying initial engaging pressure to the elements, and means for controlling the flow of fluid into the auxiliary cylinder from the main cylinder for successively applying hydraulic pressure to the auxiliary piston cumulatively with the spring pressure.

9. Mechanism for shifting frictional gripping elements of a transmission into a gripping relation comprising a hydraulically operable main cylinder, a main piston in the main cylinder, means for conducting hydraulic fluid into the main cylinder for the operation of the main piston, a series of auxiliary cylinders in the main piston, auxiliary pistons in the auxiliary cylinders, respectively, and provided with means for forcing the elements into gripping relation, spring-means in the auxiliary cylinders for initially and yieldingly pressing the auxiliary pistons into position to force the elements into gripping relation, and means for conducting fluid from the main cylinder into all of the auxiliary cylinders, for successively applying hydraulic engaging pressure to the piston cumulatively with the spring-means.

10. Mechanism for shifting frictional gripping elements of a transmission into a gripping relation comprising a hydraulically operable main cylinder, a main piston in the main cylinder for the operation of the main piston, a series of auxiliary cylinders in the main piston, auxiliary pistons in the auxiliary cylinders, respectively, and provided with means for forcing the elements into gripping relation, spring-means in the auxiliary cylinders for initially and yieldingly pressing the auxiliary pistons into position to force the elements into gripping relation, means for conducting fluid from the main cylinder into all of the auxiliary cylinders, and means for controlling the flow into the auxiliary cylinders for successively applying hydraulic engaging pressure to the piston cumulatively with the spring means.

11. Mechanism for shifting frictional gripping elements of a transmission into a gripping relation comprising a hydraulically operable main cylinder, a main piston in the main cylinder, means for conducting hydraulic fluid into the main cylinder for the operation of the main piston, an annularly arranged series of auxiliary cylinders in the main piston, auxiliary pistons in the auxiliary cylinders, respectively, and provided with means for forcing the elements into gripping relation, means for conducting fluid from the main cylinder into all of the auxiliary cylinders, the pressure exposed area of each main piston being greater than the total exposed area of the auxiliary pistons, and means for restricting the flow into the auxiliary cylinders for applying hydraulic engaging pressure to the piston.

12. Mechanism for shifting frictional gripping elements of a transmission into a gripping relation comprising a hydraulically operable main cylinder, a main piston in the main cylinder, means for conducting hydraulic fluid into the main cylinder for the operation of the main piston, a series of auxiliary cylinders in the main piston, cup-shaped auxiliary pistons in the auxiliary cylinders, respectively, provided with closed ends for forcing the elements into gripping relation, spring-means in the auxiliary cylinders for initially and yieldingly pressing the auxiliary pistons into position to force the elements into gripping relation, means for conducting fluid from the main cylinder into all of the auxiliary cylinders, and means for controlling the flow into the auxiliary cylinders for successfully applying hydraulic engaging pressure to the piston cumulatively with the spring-means.

13. Mechanism for shifting frictional gripping elements of a transmission into gripping relation, comprising a main cylinder, a hydraulically operable main piston in the main cylinder, an auxiliary cylinder in the main piston, an auxiliary piston slidably mounted in the auxiliary cylinder provided with a closed end for pressing the elements together and a skirt slidable in the auxiliary cylinder, a spring between said end and the opposite end of the auxiliary cylinder, a bolt carried by the auxiliary piston for limiting the outward movement of the auxiliary piston in the auxiliary cylinder, a spring between the auxiliary piston and the auxiliary cylinder for normally shifting the piston outwardly with in the limits of the stop bolt, and means in the auxiliary cylinder for admitting fluid under pressure to the auxiliary cylinder.

14. Mechanism for shifting frictional gripping elements of a transmission into gripping relation, comprising a main cylinder, a hydraulically operable main piston in the main cylinder, an auxiliary cylinder in the main piston, an auxiliary piston slidably mounted in the auxiliary cylinder provided with a closed end for pressing the elements together and a skirt slidable in the auxiliary cylinder, a spring between said end and the opposite end of the auxiliary cylinder, a bolt carried by the auxiliary piston for limiting the outward movement of the auxiliary piston in the auxiliary cylinder, a spring between the auxiliary piston and the auxiliary cylinder for normally shifting the piston outwardly within the limits of the stop bolt, a duct in the auxiliary cylinder for admitting fluid under pressure to the auxiliary cylinder, and a spring-pressed valve around the bolt for closing said duct.

15. Mechanism for shifting frictional gripping elements of a transmission into gripping relation, comprising a main cylinder, a hydraulically operable main piston in the main cylinder, an auxiliary cylinder in the main piston, a cup-shaped auxiliary piston slidably mounted in the auxiliary cylinder provided with a closed end for pressing the elements together and a skirt slidable in the auxiliary cylinder, a spring between said end and the opposite end of the auxiliary cylinder, a bolt carried by the auxiliary piston for limiting the outward movement of the auxiliary piston in the auxiliary cylinder, a spring within the skirt between the auxiliary piston and the auxiliary cylinder for normally shifting the piston outwardly within the limits of the stop bolt, a duct in the auxiliary cylinder for admitting fluid under pressure to the auxiliary cylinder, a spring-pressed valve for closing said ports, the skirt of the auxiliary piston being provided with an exhaust port normally open at one side of the main piston.

16. The combination with a two-speed transmission which comprises planetary gearing, a drum secured to the sun-gear, a plate-type clutch at one end of the drum for driving the drum from the sun gear, and a plate-type brake in the other end of the drum for locking the drum against rotation, of a central cross-wall in the drum, main cylinders in the drum at opposite sides of the cross-wall, respectively, main pistons slidable in said cylinders, respectively, a shaft extending through the cross-wall and connecting the main pistons for conjoint endwise movement, means for conducting fluid under pressure into the main cylinders, auxiliary cylinders in each of the pistons, auxiliary pistons in the auxiliary cylinders, and means for conducting fluid under pressure from the main cylinders into the auxiliary cylinders for forcing the auxiliary pistons in each main piston, respectively, into pressure-engagement.

17. The combination with two-speed transmission gearing which comprises planetary gearing, a drum secured to the sun-gear, a plate type clutch at one end of the drum for driving the drum from the sun gear, and a plate type brake in the other end of the drum for locking the drum against rotation, of a central cross-wall in the drum, main cylinders in the drum at opposite sides of the cross-wall, respectively, main pistons slidable in said cylinders, respectively, a shaft extending through the cross-wall and connecting the main pistons for conjoint endwise movement, means for conducting fluid under pressure into the main cylinders, auxiliary cylinders in each of the pistons, auxiliary pistons in the auxiliary cylinders, spring-means between the main pistons and the auxiliary pistons, and means for conducting fluid under pressure from the main cylinders into the auxiliary cylinders for cumulatively forcing the auxiliary pistons in each main piston, respectively, into pressure-engagement.

JOHN A. LAWLER.
SAMUEL K. HOFFMAN.